US011321156B1

(12) United States Patent
Bernatik et al.

(10) Patent No.: US 11,321,156 B1
(45) Date of Patent: May 3, 2022

(54) SYSTEM FOR UPDATING RESOURCES INDEPENDENTLY FROM SOURCE CODE

(71) Applicant: AMAZON TECHNOLOGIES, INC., Seattle, WA (US)

(72) Inventors: Jan Bernatik, Vancouver (CA); Muhammet Halit Karakis, Vancouver (CA); Kelly Duggar Wiggins, Seattle, WA (US); Tzuta Lin, Vancouver (CA); Zbynek Vyskovsky, Burnaby (CA); Kareemuddin Syed-Mohammed, Sammamish, WA (US); Srinivasane Aravamoudane, New Westminster (CA); Jonathan Benedict Beaulieu, Pittsburgh, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 266 days.

(21) Appl. No.: 16/586,015

(22) Filed: Sep. 27, 2019

(51) Int. Cl.
*G06F 11/07* (2006.01)
*G06F 8/73* (2018.01)
(Continued)

(52) U.S. Cl.
CPC .............. *G06F 11/076* (2013.01); *G06F 8/65* (2013.01); *G06F 8/73* (2013.01); *G06F 9/5011* (2013.01);
(Continued)

(58) Field of Classification Search
CPC ........ G06F 11/076; G06F 11/004; G06F 8/65; G06F 8/73; G06F 9/5011; G06F 9/546; G06F 2201/81
(Continued)

(56) References Cited

U.S. PATENT DOCUMENTS 6,314,460 B1 * 11/2001 Knight .................. G06F 3/0626
709/212
7,010,607 B1 * 3/2006 Bunton ..................... H04L 1/18
709/228
(Continued)

OTHER PUBLICATIONS

Hicks et al, "Dynamic Software Updating", ACM, pp. 13-23 (Year: 2001).*

(Continued)

*Primary Examiner* — Anil Khatri
(74) *Attorney, Agent, or Firm* — Lindauer Law, PLLC

(57) ABSTRACT

This system facilitates modification of application resources without modifying the source code of the application, while preventing modifications that may cause errors. After the source code and resources for an application are deployed, a user may provide a modified version of a resource, such as by changing a text string. The modified resource is compared to the existing version of the resource to determine if the modification will potentially cause an error when executing the application. If the modification adds or removes a parameter, changes a parameter name, changes a parameter type, or removes a resource, the change is prevented. Otherwise, the change is deployed without modifying the source code of the application. Parameters may be associated with hash codes or other types of identifiers to enable an application to locate a modified resource having a parameter that matches that of an original resource based on a matching identifier.

20 Claims, 7 Drawing Sheets

(51) Int. Cl.
*G06F 9/54* (2006.01)
*G06F 9/50* (2006.01)
*G06F 11/00* (2006.01)
*G06F 8/65* (2018.01)

(52) U.S. Cl.
CPC ............ *G06F 9/546* (2013.01); *G06F 11/004* (2013.01); *G06F 11/0772* (2013.01); *G06F 2201/81* (2013.01)

(58) Field of Classification Search
USPC .................................................. 717/168–175
See application file for complete search history.

(56) References Cited

U.S. PATENT DOCUMENTS

| | | | | |
|---|---|---|---|---|
| 7,673,031 B1* | 3/2010 | Jalagam | ............. | H04L 67/1097 709/223 |
| 8,543,543 B2* | 9/2013 | Marcelais | ............. | G06F 16/137 707/634 |
| 8,949,429 B1* | 2/2015 | Chuang | ............. | G06F 9/50 709/226 |
| 9,003,387 B2* | 4/2015 | Van Camp | ............. | G06F 8/65 717/170 |
| 9,026,667 B1* | 5/2015 | Joyce | ............. | G06F 21/6227 709/229 |
| 9,037,922 B1* | 5/2015 | Cabrera | ............. | G06F 11/3495 714/47.1 |
| 9,235,409 B1* | 1/2016 | Guo | ............. | G06F 8/65 |
| 9,448,790 B2* | 9/2016 | Collison | ............. | G06F 8/60 |
| 9,503,351 B1* | 11/2016 | Gabrielson | ............. | H04L 41/28 |
| 9,544,399 B2* | 1/2017 | Bragstad | ............. | H04L 41/22 |
| 9,898,336 B2* | 2/2018 | Schimpf | ............. | G06F 8/20 |
| 10,379,838 B1* | 8/2019 | Chud | ............. | G06F 11/079 |
| 10,725,763 B1* | 7/2020 | Chud | ............. | G06F 8/71 |

OTHER PUBLICATIONS

Zhen-Hai et al, "Automatic Updating Method Based on Maven", IEEE, pp. 1074-1077 (Year: 2014).*
Previtali et al, "Dynamic Updating of Software Systems Based on Aspects", IEEE, pp. 1-10 (Year: 2006).*
Asokan et al, "ASSURED: Architecture for Secure Software Update of Realistic Embedded Devices", IEEE, pp. 2290-2300 (Year: 2018).*
Deng et al, "Optimal Application Deployment in Resource Constrained Distributed Edges", IEEE, pp. 1907-1923 (Year: 2021).*
Wang et al, "A Machine Learning Framework for Resource Allocation Assisted by Cloud Computing", IEEE, pp. 144-151 (Year: 2018).*
Sun et al, "A Reliability-Aware Approach for Resource Efficient Virtual Network Function Deployment", IEEE, pp. 18238-18250 (Year: 2018).*
Pawar et al, "Priority Based Dynamic resource allocation in Cloud Computing", IEEE, pp. 1-6 (Year: 2012).*

* cited by examiner

SYSTEM FOR UPDATING RESOURCES INDEPENDENTLY FROM SOURCE CODE

BACKGROUND

When an application is deployed, the application typically includes multiple resources that are utilized by the application source code. If the source code uses a parameter that is not included in the resources to determine the content that is presented, this may cause an error when the application is executed. To reduce the possibility of such errors, when a resource is modified, it is normally required to redeploy the application, including its source code and other resources, with the modified resource.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
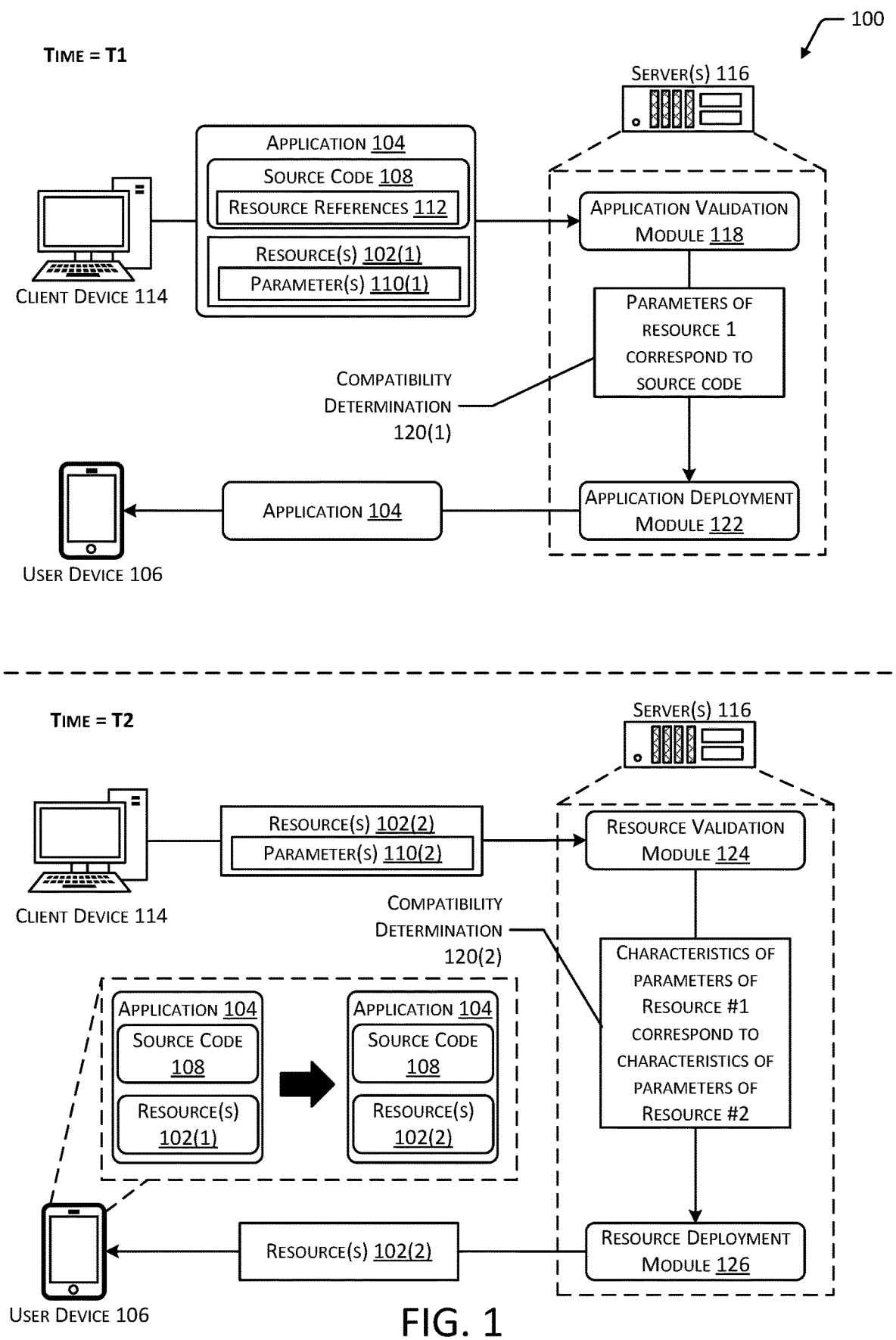
FIG. 1 depicts an implementation of a system that enables modifying resources for an application based on a determination that the modifications to the resources are unlikely to cause an error when executing the application.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An application that is executed by a computing device typically includes source code that utilizes one or more resources. For example, an application to present a webpage or other type of user interface may utilize various types of resources, such as string resources that cause presentation of an alphanumeric string, images that cause presentation of image data, and so forth. A resource may include one or more parameters, which may serve as a placeholder for one or more values. A resource may not necessarily include any parameters. For example, a resource may cause presentation of a text string or image without presenting a value determined from another source. As one example, a resource may cause presentation of the text string "Hello,", followed by the parameter "{name}", which may cause the text string to be presented in conjunction with a value for the parameter when the source code is executed. Before the application is initially deployed to a computing device, the source code and resources may be analyzed to determine that the source code does not reference a parameter that is not included in the associated resources. This may reduce the possibility of errors when the application is executed. For example, if the source code causes presentation of text that includes a value for the parameter "{name}", but the resource erroneously includes the parameter "{namee}", such as due to a typographical error by a user, this mismatch may cause the text string associated with the resource to be omitted or to be erroneously displayed.

One potential source of such errors may include the modification of resources. For example, a user may wish to modify a resource to present a text string in a different language if a user interface is viewed in a different country. If the modification to the resource modifies the name of a parameter, adds a parameter, or removes a parameter, and a corresponding modification to the source code is not made, this may cause an error. To prevent such errors, when a modification is made to a resource, the modified resource is typically not deployed without comparing the source code to the parameters referenced by the resource, then redeploying the entire application, which may include the source code for the application, the modified resource, and various other resources. In some cases, redeployment of an application may utilize a considerable amount of time and computational resources.

Described in this disclosure are techniques for enabling a single resource, multiple resources, or a portion of a resource to be modified without redeploying the source code of an associated application. When a modification to a resource is received, rather than comparing the parameters indicated in the modified resource to the source code, the modified resource may be compared to the original, unmodified resource to determine whether the modification is compatible (e.g., unlikely to result in an error) or incompatible (e.g., likely to result in an error when the application is executed). For example, if a modification to a resource changes the name of a parameter, adds a parameter, removes a parameter, removes the resource, or changes a resource type (e.g., changes the resource from a simple message to a plural message), the modification may be prevented. If the application were executed without ensuring that the source code corresponds to the modified resource, an error may occur. Conversely, if a modification to the resource changes a semantic characteristic, such as the text of an alphanumeric string but retains the same parameter names and the same count of parameters, the modification may be permitted, and the original resource may be replaced with the modified resource. If the application were executed after such a change, it is unlikely that the change would cause an error. In some implementations, a permissible modification may result in generation of a notification requesting user review.

For example, if a text string associated with a resource is modified to change the size of the text string significantly, such as by adding a quantity of text greater than a threshold value, a notification requesting user review may be generated. Prior to receipt of user input approving the modified resource, the original version of the resource may be used. Subsequent to receipt of user input approving the modified resource, the modified resource may be used.

In some implementations, a modified resource may be associated with an identifier indicative of one or more parameters indicated in the resource. For example, based on the parameter names indicated in a resource and in some cases, other characteristics of the resource, a hash code or other type of identifier may be generated. The hash code or other type of identifier may be used to deploy the modified resource to multiple computing devices. For example, when a computing device storing the associated application starts up, when the application is executed, after passage of a selected time period, or in response to user input, the application may determine whether modified resources that are associated with the application have been generated using the hash code or other type of identifier. Continuing the example, if a first resource stored in association with the application includes a parameter having a particular name, a hash code generated based on that name may have a particular value. If a second resource is generated to replace the first resource, and the second resource includes the same parameter having the same name, a hash code generated based on the name of the parameter may have the same value. The application may determine and obtain the modified resource by determining that the hash code for the modified resource matches the hash code for the original resource. Use of hash codes or other types of identifiers that are generated based on the parameters indicated in the resource may enable a modified resource to be efficiently deployed to a large number of computing devices, such as by using a pull architecture initiated by the computing devices, rather than pushing the modified resource to multiple computing devices. Additionally, use of hash codes or other types of identifiers that are based on the parameters may enable errors caused by mismatched parameters to be avoided. For example, if a modification to a resource changes the name of a parameter, the hash code or other type of identifier generated for the modified resource would differ from the identifier associated with the original resource. As a result, the application would not attempt to replace the original resource with the modified resource due to the lack of matching identifiers.

As one skilled in the art will appreciate in light of this disclosure, certain embodiments may be capable of achieving certain advantages. For example, comparing the parameters or other characteristics of a modified resource to those of the original resource, without requiring the source code of an application to be accessed or modified, may enable particular resources for an application to be deployed without redeploying the source code or redeploying other resources. This may enable developers and editors of an application to modify resources without consuming the time and computational resources necessary to redeploy the entire application. Additionally, modifying resources in this manner may enable developers to test applications and changes to resources without redeploying an application. In a similar manner, resources may be reverted to previous versions without redeploying the application, due to the fact that the previous version would also include the same parameters as the modified version. Use of hash codes or other types of identifiers that are generated based on the parameters indicated in a resource may enable modified resources to be deployed to a large number of computing devices efficiently, such as by using a pull architecture. Additionally, use of hash codes or other identifiers that are based on the characteristics of the parameters, such as parameter names, may prevent resources that include incompatible changes that may cause errors from being deployed. For example, if a modified version of a resource includes a different parameter name, the hash code or other identifier generated based on the name will differ from the hash code or other identifier based on the name of the original version of the resource that includes the original parameter name.

FIG. 1 depicts an implementation of a system 100 that enables modifying resources 102 for an application 104 based on a determination that the modifications to the resources 102 are unlikely to cause an error when executing the application 104. After such a determination, modifications for resources 102 may be provided to a user device 106, such as by replacing an original version of a resource 102(1) with a modified version of the resource 102(2). An application 104 may include source code 108 that, when executed, utilizes one or more resources 102(1) to perform a function, such as generation and presentation of a user interface. For example, the resource(s) 102(1) may affect the location, color, dimensions, text, or other characteristics of elements presented in a user interface. Continuing the example, a resource 102(1) may include an alphanumeric string (e.g., a text string) to be presented in a webpage. The resource 102(1) may also include one or more parameters 110, such as variables or other types of values that may be determined from other sources. For example, a resource 102(1) named "message" may include the text string "Hello," followed by the parameter 110 "{name}". The value for the parameter 110 may be determined when the application 104 is executed, such as by retrieving a name associated with a user account. For example, if a user account is associated with the name "Bob", the application 104, when executed, may cause the text "Hello, Bob" to be presented based on the resource 102(1) named "message". The source code 108 may include one or more resource references 112 that may indicate the resources 102 used by the application 104 when executed. In some implementations, the source code 108 may indicate characteristics of the resources 102, such as parameters 110(1) of one or more of the associated resources 102(1). For example, the source code 108 of the application 104 may cause a value for the parameter 110 "{name}" to be determined when the application 104 is executed. While FIG. 1 depicts a resource 102(1) that includes a single parameter 110(1), a resource 102 may include any number of parameters 110, including zero parameters 110, a single parameter 110, or multiple parameters 110.

If the source code 108 utilizes parameters 110 not included in the resource(s) 102(1), this may cause an error when the application 104 is executed. Additionally, in some cases, if the resource(s) 102(1) include one or more parameter(s) 110(1) not indicated in the source code 108, this may also cause an error. For example, if the source code 108 uses the parameter 110 "{firstname}" when determining content for presentation, but this parameter 110 is not included in the resource(s) 102(1), a value for the parameter 110 may not be determined, and text strings or other data that include the value for the parameter 110 may not be presented properly. As such, before an application is provided to a user device 106 (e.g., deployed), the application may be validated to determine that the resource references 112 in the source code 108 correspond to the parameter(s) 110(1) of the resource(s)

102(1). Specifically, at a first time T1, FIG. 1 depicts a client device 114 providing the application 104 to one or more servers 116. The client device 114 may include any type of computing device including, without limitation, a portable computing device such as a laptop computing device, a tablet computing device, a smartphone, or a wearable computing device, a desktop computing device, an automotive computing device, a set top box, a server, and so forth. While FIG. 1 depicts a single client device 114, multiple client devices 114 may be used. The server(s) 116 may include any number and any type of computing devices including, without limitation, the types of computing devices described with regard to the client device 114. Additionally, while FIG. 1 depicts the client device 114 and server(s) 116 as separate computing devices, in some implementations, one or more functions described herein with regard to the client device 114 may be performed by the server(s) 116, or one or more functions described with regard to the server(s) 116 may be performed by the client device 114. For example, in some cases, use of two separate computing devices may be omitted and all of the functions described with regard to the client device 114 and server(s) 116 may be performed using a single computing device or group of computing devices.

An application validation module 118 associated with the server(s) 116 may generate a compatibility determination 120(1) based on correspondence between the source code 108 and the resources 102(1). If the compatibility determination 120(1) indicates that the parameters 110(1) of the resource 102(1) correspond to the source code 108, an application deployment module 122 associated with the server(s) 116 may provide the application 104 to the user device 106. If the compatibility determination 120(1) indicates a mismatch between the resource references 112 and the parameters 110(1) of the resource(s) 102(1), the application 104 may be prevented from deployment to the user device 106 and a notification indicative of the mismatch may be generated. A mismatch may occur if the source code 108 indicates a parameter 110 that is not included in the resource(s) 102(1) or if the resource(s) 102(1) include a parameter 110(1) not indicated by the source code 108. For example, if the count of parameters 110 indicated in the source code 108 differs from the count of parameters 110(1) associated with the resource(s) 102(1), this may indicate a mismatch. As another example, if a parameter 110(1) of the resource(s) 102(1) includes a different name from a corresponding parameter 110 indicated in the source code 108, this may indicate a mismatch. Continuing the example, if the parameter 110 "{name}" is instead input as "{firstname}" or "{namee}" due to a user mistake or typographical error, this may result in a mismatch. When an application is validated or when an application 104 is provided to a user device 106, a log, snapshot, or other type of data indicating the resources 102(1) that were provided with the application 104 may be generated and stored in association with the server(s) 116.

At a second time T2 subsequent to the first time T1, a user associated with the client device 114 may wish to modify one or more resources 102(2) associated with the application 104 without modifying the source code 108 or redeploying the source code 108 or other resources 102(1) of the application 104. For example, a user may translate text within a first resource 102(1) into a different language, creating a second resource 102(2). Redeploying the entire application 104 due to a semantic change to a text string associated with one or more resources 102 may consume significant time and computational resources. As such, the server(s) 116 may instead analyze the resource(s) 102(2) without necessarily accessing the source code 108 or transmitting the source code 108 or other resources 102(1) to the user device 106. As shown in FIG. 1, the client device 114 may transmit one or more second resources 102(2) (e.g., modified resources) to replace one or more of the first resources 102(1) (e.g., original resources) deployed with the application 104. The second resources 102(2) may be provided to the server(s) 116 without providing corresponding source code 108 or other resources 102(1). The second resources 102(2) may include one or more parameters 110(2).

A resource validation module 124 associated with the server(s) 116 may generate a compatibility determination 120(2) indicative of correspondence between characteristics of the parameters 110(1) of the first resource(s) 102(1) and characteristics of the parameters 110(2) of the second resource(s) 102(2). For example, if a log, snapshot, or other type of data indicative of the resources 102(1) that were provided at the first time T1 is stored in association with the server(s) 116, this data may be compared with the received second resource(s) 102(2). If the compatibility determination 120(2) indicates that characteristics of the parameters 110(1) of the first resource(s) 102(1) correspond to the characteristics of the parameter(s) 110(2) of the second resource(s) 110(2), a resource deployment module 126 associated with the server(s) 116 may provide the resources 102(2) to the user device 106. The user device 106 may modify the application 104, such as by replacing one or more of the original resources 102(1) with one or more of the modified resources 102(2). In other implementations, the user device 106 may modify one or more of the original resources 102(1) based on the modified resources 102(2). For example, a modified resource 102(2) may include a change to an original resource 102(1), which may be implemented by the user device 106 using functionality associated with the application 104 or another module of the user device 106.

If the compatibility determination 102(2) indicates a mismatch, the original resource(s) 102(1) may be retained in association with the application 104 and the modified resource(s) 102(2) may not be provided to the user device 106. In some cases, a notification indicating the mismatch may be generated. For example, a notification may indicate a particular parameter 110 of the modified resource(s) 102(2) that is not included in the original resource(s) 102(1). Mismatches may include a parameter 110 included in the modified resource(s) 102(2) that is not included in the original resource(s) 102(1) or a parameter 110 included in the original resource(s) 102(1) that is not included in the modified resource(s) 102(2). For example, if the modified resources 102(2) include the addition of a parameter 110, the removal of a parameter 110, or a change in the name of a parameter 110, one of the original resource(s) 102(1) or the modified resource(s) 102(2) would include a parameter 110 not present in the other of the original resource(s) 102(1) or the modified resource(s) 102(2). Similarly, if the modified resource(s) 102(2) include a count of parameters 110 that differs from a count of parameters 110 in the original resource(s) 102(1), this may indicate a mismatch. In other implementations, if the modified resource(s) 102(2) include a different parameter type than the original resource(s) 102(1), such as by changing a parameter that presents a date to a parameter that presents a numeric string, this may constitute a mismatch.

In some implementations, if the parameters 110(2) associated with the modified resource(s) 102(2) match the parameters 110(1) associated with the original resource(s) 102(1), but a semantic characteristic of the modified resource(s) 102(2) differs by more than a threshold value, a notification may be generated requesting user review of the modified resource(s) 102(2). For example, a modified resource 102(2) may include a significantly greater or smaller quantity of text (e.g., count of characters) than an original resource 102(1). Continuing the example, if a resource 102(1) named "message" includes the text string "Hello," followed by the parameter 110 "{name}", while a modified resource 102(2) includes the text string "It is our greatest pleasure to welcome you back. Greetings," followed by the parameter 110 "{name}", the significantly greater quantity of text (e.g., greater than a threshold) present in the modified resource 102(2) may cause generation of a notification. The original resource 102(1) may remain associated with the application 104 until user input approving the modified resource 102(2) is received, after which the modified resource 102(2) may replace the original resource 102(1).

Figure 2:
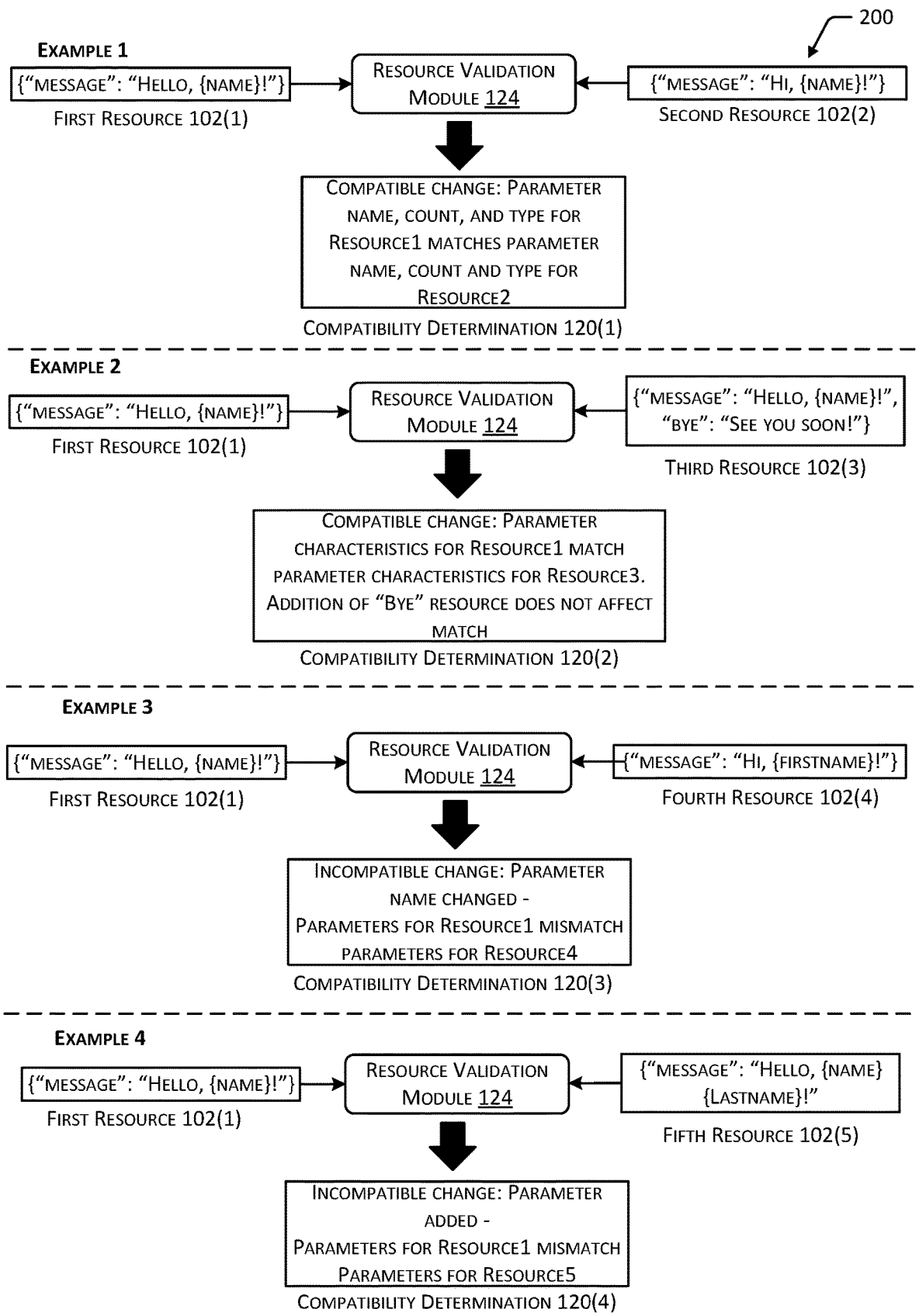
FIG. 2 is a series of block diagrams depicting examples of generation of compatibility determinations based on modifications to resources.

FIG. 2 is a series of block diagrams 200 depicting examples of generation of compatibility determinations 120 based on modifications to resources 102. As described with regard to FIG. 1, when a modified version of a resource 102(2) is received to replace an existing version of a resource 102(1), certain modifications may be likely to generate an error when the associated application 104 is executed, while other modifications may be unlikely to generate an error. For example, modifications to a resource 102 that change the name, type, or other characteristics of a parameter 110, or modifications that add or remove parameters 110, may cause an error when executing the application 104 unless corresponding modifications are made to the source code 108 and the source code 108 is redeployed. However, modifications to a resource 102 that are semantic, such as changes to a text string that do not change the parameters 110 of the resource 102, are less likely to cause an error when the application 104 is executed. As such, deploying the modified resource 102(2) without redeploying the source code 108 or other resources 102 of the application 104 may conserve time and computational resources without causing an error.

FIG. 2 depicts a first resource 102(1) (e.g., an original version of a resource 102) that is named "message" and includes the text string "Hello," followed by the parameter 110 "{name}". In Example 1, a second resource 102(2) "{'Message': 'Hi, {Name}!'}" may be received by the resource validation module 124. The resource validation module 124 may generate a compatibility determination 120(1) based on correspondence between the first resource 102(1) and the second resource 102(2). Specifically, the second resource 102(2) modifies the first resource 102(1) by changing the text string "Hello" to "Hi", but maintains the same structure for the resource 102(2) and the same parameter 110, "{Name}". As such, the compatibility determination 120(1) indicates that the change associated with the second resource 102(2) is compatible due to the parameter name, count, and type for the first resource 102(1) matching the parameter name, count, and type for the second resource 102(2).

In Example 2, FIG. 2 depicts the resource validation module 124 receiving a third set of resources 102(3) to replace the first resource 102(1). The third resources include a first string resource 102(3), "'Message': 'Hello, {Name}!'" and add a second string resource 102(3), "'Bye': 'See you soon!'". Based on correspondence between the first resource 102(1) and the third resources 102(3), the resource validation module 124 may generate a compatibility determination 120(2). Specifically, the third resources 102(3) modify the first resource 102(1) by adding a second string resource 102(3), but do not add, remove, or change any parameters 110 relative to the first resource 102(1). The compatibility determination 120(2) may indicate that the change associated with the third resources 102(3) is compatible due to the parameter characteristics for the first resource 102(1) matching the parameter characteristics of the third resources 102(3).

In Example 3, FIG. 2 depicts the resource validation module 124 receiving a fourth resource 102(4) to replace the first resource 102(1). The fourth resource 102(4) includes the string "'Message:' "Hi, {Firstnanne}!'". Based on correspondence between the first resource 102(1) and the fourth resource 102(4), the resource validation module 124 may generate a compatibility determination 120(3). The fourth resource 102(4) modifies the first resource 102(1) by changing the text string "Hello" to "Hi" and changing the name of the parameter "{Name}" to "{Firstname}". The compatibility determination 120(3) may therefore indicate that the change associated with the fourth resource 102(4) is incompatible due to a mismatch between the parameters 110 of the first resource 102(1) and the parameters 110 of the fourth resource 102(4). For example, if the fourth resource 102(4) was used to replace the first resource 102(1) without modifying and redeploying the source code 108 for the application 104, an error may occur when the application 104 is executed. Continuing the example, the source code 108 may utilize the parameter 110 "{name}", that was present in the original first resource 102(1), while the modified fourth resource 102(4) instead includes the parameter 110 "{firstname}". The mismatch between the parameters 110 may cause content associated with the fourth resource 102(4) to be presented improperly or omitted.

In Example 4, FIG. 2 depicts the resource validation module 124 receiving a fifth resource 102(5) to replace the first resource 102(1). The fifth resource 102(5) includes the string "'Message:' "Hello, {Name} {Lastname}!'". The fifth resource 102(5) modifies the first resource 102(1) by adding a second parameter 110 "{Lastname}". The compatibility determination 120(4) may indicate that the change associated with the fifth resource 102(5) is incompatible due to a mismatch between the parameters 110 of the first resource 102(1) and the parameters 110 of the fifth resource 102(5). For example, if the fifth resource 102(5) was used to replace the first resource 102(1) without modifying and redeploying the source code 108 for the application 104, an error may occur when the application 104 is executed due to the source code 108 lacking a reference to the added parameter 110 "{Lastname}".

Figure 3:
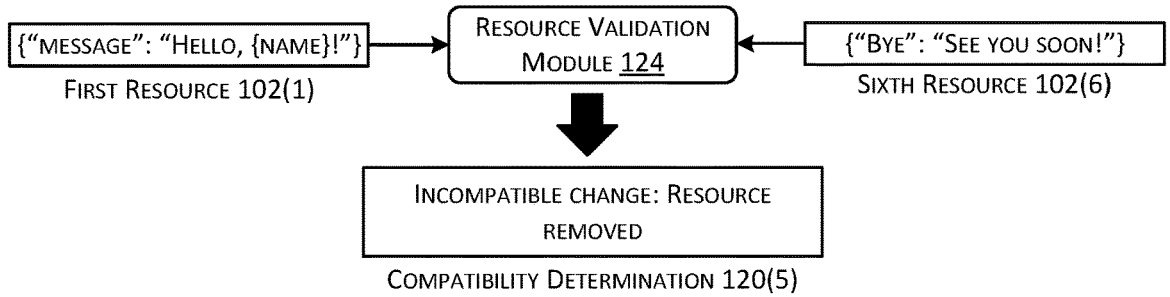
FIG. 3 is a series of block diagrams depicting additional examples of generation of compatibility determinations based on modifications to resources.
Figure 3:
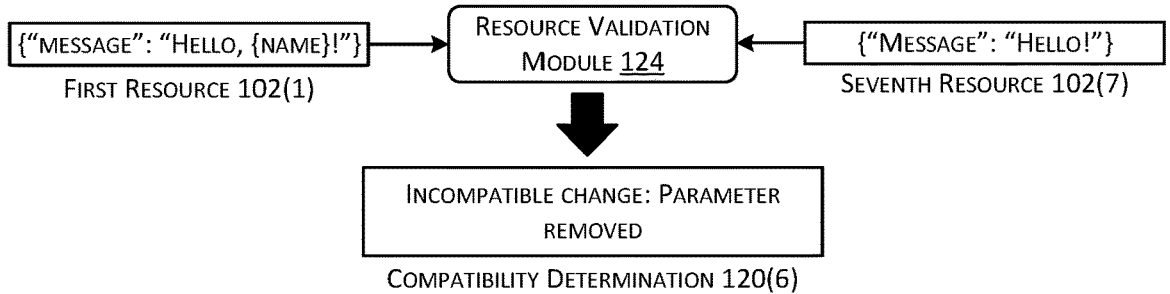
Figure 3:
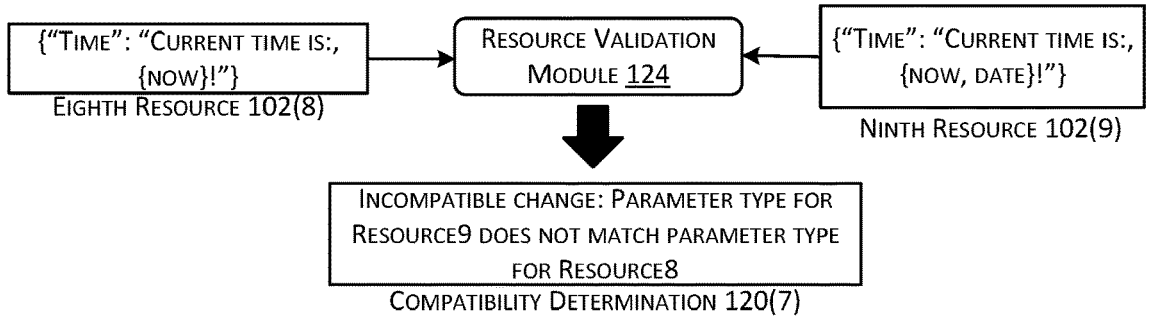
Figure 3:
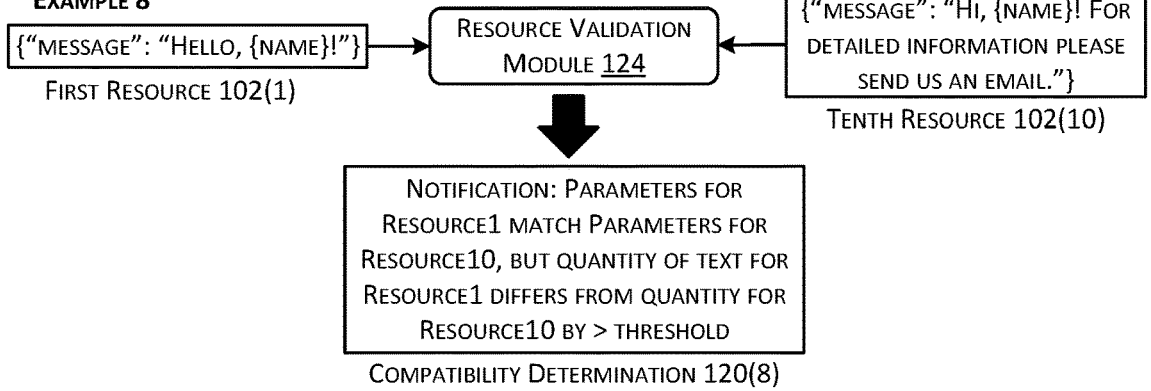

FIG. 3 is a series of block diagrams 300 depicting additional examples of generation of compatibility determinations 120 based on modifications to resources 102. As described with regard to FIGS. 1 and 2, modifications to resources 102 that change the parameters 110 of a resource 102 may cause errors if the source code 108 is not also modified and redeployed. In some implementations, other types of modifications, such as changes to a directional presentation of text, or significant changes to text strings may also potentially cause errors.

FIG. 3 depicts the first resource 102(1) including the string "'Message:' 'Hello, {Name}!'". In Example 5, a sixth resource 102(6) including the alternate string "'Bye:' 'See you soon!'" is received by the resource validation module 124. The sixth resource 102(6) modifies the first resource 102(1) by removing the first string resource 102(1) "Message" that includes the parameter 110 "{Name}", and adding a different string resource 102(6) "Bye" that does not reference a parameter 110. The compatibility determination 120(5) may indicate that the change associated with the sixth resource 102(6) is incompatible due to the removal of the first resource 102(1).

In Example 6, FIG. 3 depicts the resource validation module 124 receiving a seventh resource 102(7). The seventh resource 102(7) differs from the first resource 102(1) by removal of the parameter 110 "{Name}". Specifically, while the first resource 102(1) includes the string "Hello, {Name}!", the seventh resource 102(7) includes the string "Hello!" and lacks a reference to a parameter 110. The compatibility determination 120(6) may indicate that the change associated with the seventh resource 102(7) is incompatible due to removal of a parameter 110. For example, removal of the parameter 110 may result in a mismatch between the parameters 110 of the first resource 102(1) and the parameters 110 of the seventh resource 102(7). Specifically, due to the removal of the parameter 110 "{Name}" from the seventh resource 102(7), if the seventh resource 102(7) was used to replace the first resource 102(1) without modifying and redeploying the source code 108, an error may occur when the application 104 is executed due to the seventh resource 102(7) lacking a reference to the parameter 110 "{Name}".

In Example 7, FIG. 3 depicts an eighth resource 102(8), "Time" that includes the string "Current time is: {Now}!", which references the parameter 110 "{Now}". The resource validation module 124 may receive a ninth resource 102(9) to replace the eighth resource 102(8). The ninth resource 102(9) changes the type associated with the parameter 110 "{Now}" to "Date". The compatibility determination 120(7) may indicate that the change associated with the ninth resource 102(9) is incompatible due to the change in the parameter type associated with the parameter 110 of the ninth resource 102(9). Specifically, due to a mismatch between the parameter type of the eighth resource 102(8) and the parameter type of the ninth resource 102(9), the incompatible change associated with the ninth resource 102(9) may be prevented. Other mismatches associated with parameter type may include a format associated with the parameter 110, such as whether a parameter 110 is associated with a Java message format or an ICU message format.

In Example 8, FIG. 3 depicts the resource validation module 124 receiving a tenth resource 102(10) which presents the text string "'Message:'Hi, {Name}! For detailed information please send us an email.'". Specifically, the tenth resource 102(10) modifies the first resource 102(1) by adding a significant quantity of text to the original text string. The compatibility determination 120(8) may generate a notification indicative of the change associated with the tenth resource 102(10) due to the quantity of added text associated with the tenth resource 102(10) exceeding a threshold value. For example, even though the parameters 110 of the tenth resource 102(10) match the parameters 110 of the first resource 102(1), significantly increasing or decreasing the quantity of text associated with a resource 102 may cause the text to be displayed improperly or in a non-aesthetic manner. In such a case, a notification requesting user review of the tenth resource 102(10) may be generated. In response to user input approving the tenth resource 102(10), the tenth resource 102(10) may be used to replace the first resource 102(1). In the absence of such user input, or if user input is received that does not approve the tenth resource 102(10), the first resource 102(1) may remain associated with the application 104. Other changes to a resource 102 for which a notification may be generated may include changes in the directional presentation of text, changes in the layout, arrangement, or other configurations associated with the presentation of text or images, and so forth.

Figure 4:
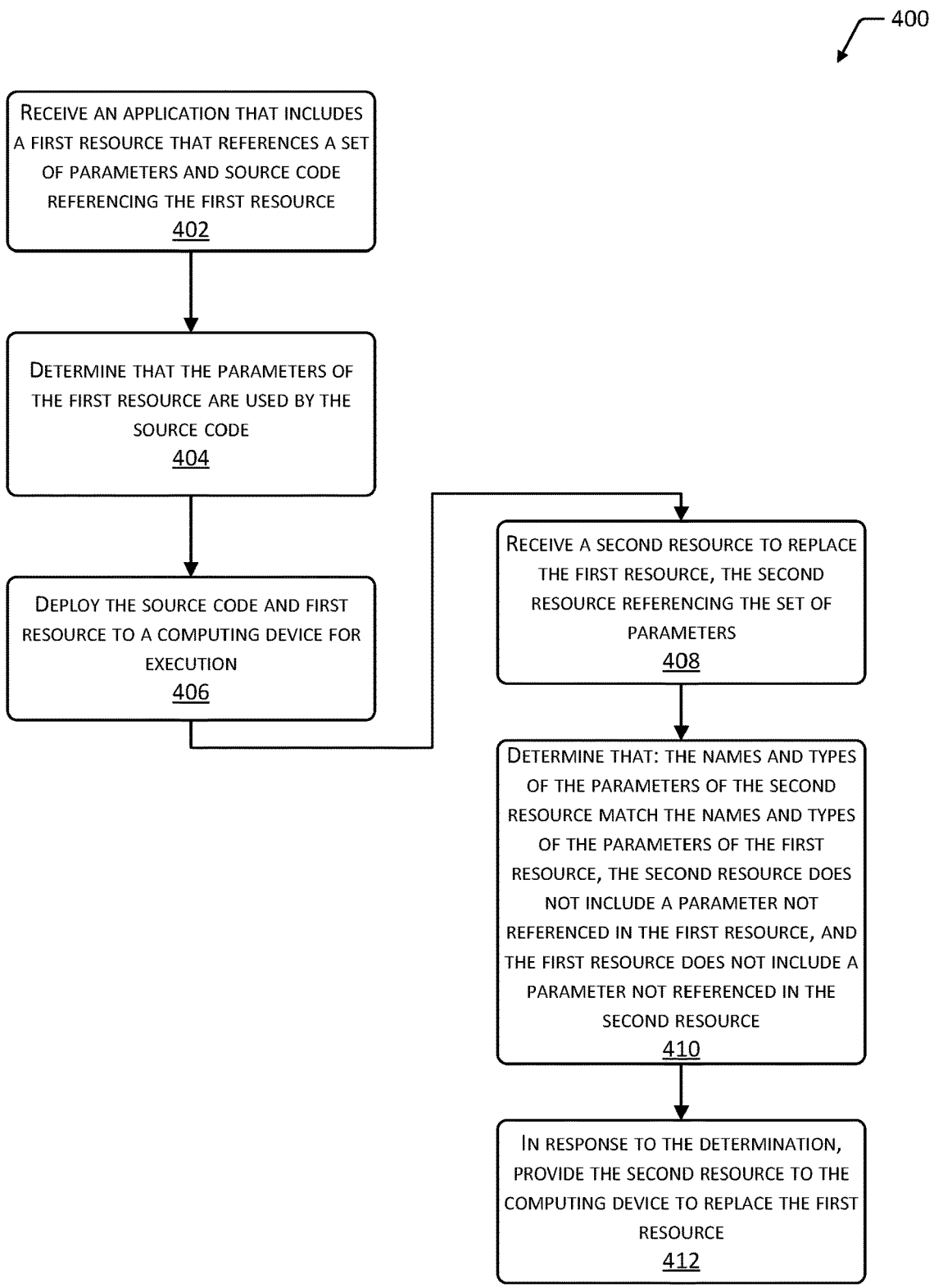
FIG. 4 is a flow diagram illustrating an implementation of a method for modifying a resource associated with an application based on a determination that a modified resource is unlikely to cause an error when executing the application.

FIG. 4 is a flow diagram 400 illustrating an implementation of a method for modifying a resource 102 associated with an application 104 based on a determination that a modified resource 102 is unlikely to cause an error when executing the application 104. At 402, an application 104 that includes a first resource 102(1) that references a set of parameters 110, and source code 108 referencing the first resource 102(1) may be received. For example, as described with regard to FIG. 1, a client device 114 may provide an application 104 to one or more servers 116. The source code 108 of the application 104 may include one or more resource references 112, while the resource 102(1) may indicate one or more parameters 110.

At 404, it may be determined that the parameters 110 of the first resource 102(1) are used by the source code 108. As described with regard to FIG. 1, an application validation module 118 or another module associated with the server(s) 116 or client device 114 may determine correspondence between the source code 108 and the resources 102 associated with an application 104. For example, the correspondence between the source code 108 and the first resource 102(1) may indicate that the parameters 110 used by the source code 108 match the parameters 110 included in the resource 102(1). Continuing the example, if the source code 108 does not reference a parameter 110 not included in a resource 102, and a resource 102 does not include a parameter 110 not referenced in the source code 108, the matching parameters 110 may indicate that execution of the application 104 is unlikely to cause an error that is associated with the application resources 102.

As such, at 406, the source code 108 and first resource 102(1) may be deployed to a computing device for execution. For example, as shown in FIG. 1, an application deployment module 122 may provide the application 104, which includes the source code 108 and associated resources 102, to a user device 106, which may execute the application 104.

At 408, a second resource 102(2) may be received to replace the first resource 102(1). The second resource 102(2) may reference the set of parameters 110 that was included in the first resource 102(1), or one or more different parameters 110. As described in FIG. 1, a resource validation module 124 associated with the server(s) 116 or client device 114 may receive the second resource 102(2). The resource validation module 124 may determine correspondence between the first resource 102(1) and the second resource 102(2) to determine whether the modifications represented by the second resource 102(2) may cause an error when executing the application 104. For example, if the parameters 110 of the second resource 102(2) do not match the parameters 110 of the first resource 102(1), if the second resource 102(2) adds one or more parameters 110 not included in the first resource 102(1), or if the second resource 102(2) removes a parameter 110 included in the first resource 102(1), this may cause an error when the application 104 is executed.

At 410, a determination may be made regarding whether the second resource 102(2) represents a compatible change to the first resource 102(1) that is unlikely to cause an error. Specifically, it may be determined that the names and types of the parameters 110 of the first resource 102(1) match the names and types of the parameters 110 of the second resource 102(2), the second resource 102(2) does not include a parameter 110 not referenced in the first resource 102(1), and the first resource 102(1) does not include a parameter 110 not referenced in the second resource 102(2). In some implementations, the resource validation module 124 may determine that a count of parameters 110 associated with the first resource 102(1) matches a count of parameters 110 associated with the second resource 102(2). As described with regard to FIG. 3, in some implementations, the resource validation module 124 may also determine that a directional presentation of text associated with the second resource 102(2) does not differ from a directional presentation associated with the first resource 102(1) and that a quantity of text associated with the second resource 102(2) does not differ from the quantity of text associated with the first resource 102(1) by more than a threshold value.

At 412, in response to the determination that the parameters 110 of the second resource 102(2) match the parameters 110 of the first resource 102(1), the second resource 102(2) may be provided to the computing device to replace the first resource 102(1). In such a case, the second resource 102(2) may be provided to replace the first resource 102(1) immediately, without modifying the source code 108 or other resources 102 associated with the application 104, such as during runtime. In some implementations, the computing device may overwrite the first resource 102(1) using the second resource 102(2), delete the first resource 102(1), or store both resources 102 but generate an indication that the second resource 102(2) is to be used when executing the application 104. In other implementations, the computing device may modify the first resource 102(1) based on the second resource 102(2). For example, a modified resource 102(2) may include a change to an original resource 102(1), which may be made to the original resource 102(1) using functionality associated with the application 104 or another module of the user device 106. In cases where the parameters 110 of the second resource 102(2) do not match the parameters 110 of the first resource 102(1), the second resource 102(2) may possibly be used to replace the first resource 102(1) at a future time when the source code 108 is modified or redeployed. For example, as described with regard to FIG. 1, when an application 104 is deployed, a determination may be made regarding whether the second resource 102(2) corresponds to the modified source code 108.

In some implementations, one or more of the client device 114 providing the second resource 102(2) or the user device 106 that receives the second resource 102(2) may also determine whether the change to the first resource 102(1) represented by the second resource 102(2) is a compatible change that is unlikely to cause an error. For example, the client device 114, user device 106, or both the client device 114 and user device 106 may compare the names, types, or other characteristics of the parameters 110(1) associated with the first resource 102(1) with those of the parameters 110(2) associated with the second resource 102(2). Performance of this process by the user device 106 may improve security, such as by preventing updated resources 102 from untrustworthy sources from causing errors. For example, if an incompatible resource 102 is received from an untrustworthy source, performance of this process by the user device 106 may detect the incompatible change, and use of the incompatible resource 102 may be prevented.

Figure 5:
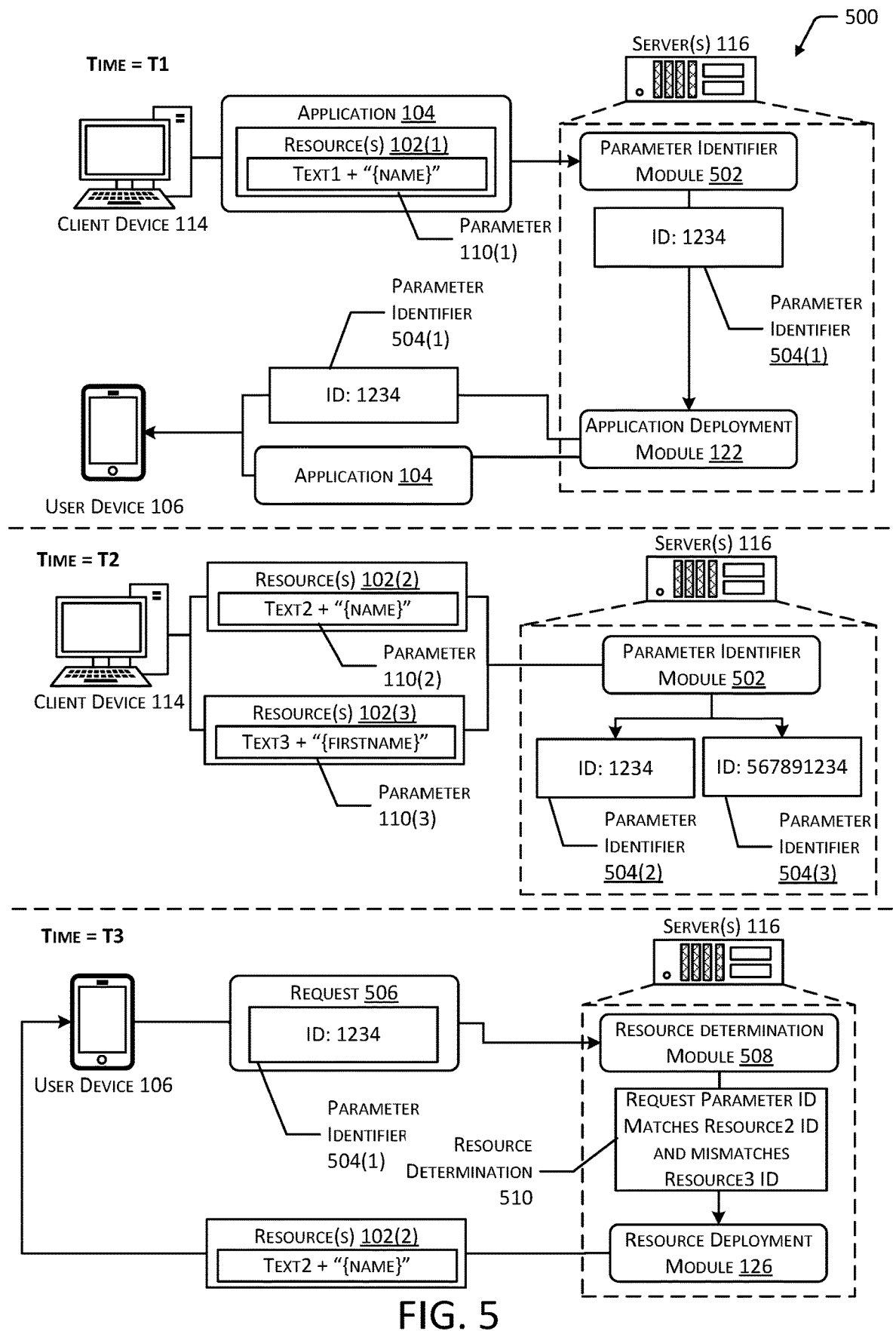
FIG. 5 depicts an implementation of a system that enables modifying resources for an application using identifiers generated based on characteristics of the parameters included in the resources.

FIG. 5 depicts an implementation of a system 500 that enables modifying resources 102 for an application 104 using identifiers generated based on characteristics of the parameters 110 included in the resources 102. As described with regard to FIG. 1, a client device 114 may provide an application 104 to one or more servers 116. The application 104 may include one or more resources 102(1). As one example, a resource 102(1) may cause presentation of a text string when the application 104 is executed and may reference one or more parameters 110(1). Continuing the example, FIG. 5 depicts a first resource 102(1) that includes a first parameter 110(1), "{Name}". As described with regard to FIG. 1, the application 104 may also include source code 108 that references one or more parameters 110, other resources 102, and so forth, and the source code 108 and resources 102 may be used to generate a compatibility determination 120 indicating whether the parameters 110 used by the source code 108 match those of the resources 102.

In some cases, a large number of user devices 106, host devices, or other types of computing devices that utilize an application 104 may exist. In such a case, sending an application 104 and resources 102 to these computing devices, such as by using a push architecture, may consume significant time, labor, and computational resources. In the system 500 of FIG. 5, parameters 110 of resources 102 may be associated with identifiers, which may be used both to enable compatible modified resources 102 to be identified, avoiding errors when executing the application 104, and also to enable computing devices to obtain modified resources 102 using a pull architecture based on the identifiers.

At a first time T1, FIG. 5 depicts a parameter identifier module 502 associated with the server(s) 116 that receives the application 104 and associated resources 102(1) from the client device 114. The parameter identifier module 502 may generate a parameter identifier 504(1) based on the parameters 110(1) of the first resource(s) 102(1). In some implementations, the parameter identifier 504(1) may include a hash code that is generated based on the name of the parameter 110(1). In other implementations, parameter identifiers 504(1) may be generated based on other characteristics of the parameters 110(1) associated with the resource(s) 102(1). For example, a parameter identifier 504(1) may include a checksum or other value determined based on a set of parameters 110(1) associated with the first resource(s) 102(1). In some cases a set of multiple resources 102(1) may be associated with a checksum or other type of value or identifier. Independent of the type of parameter identifier 504(1) that is used, the parameter identifier 504(1) may function as a unique signature that represents the characteristics of the parameters 110(1) included in the first resource(s) 102(1) that were used to generate the parameter identifier 504(1). When the application 104 is provided to the user device 106, the parameter identifier 504(1) associated with the resources 102(1) of the application 104 may also be provided. In other implementations, the user device 106 may determine the parameter identifier 504(1) based on the parameters 110(1) of the resources 102(1).

At a second time T2, the client device 114 may provide one or more modified resources 102 to the server(s) 116. Specifically, FIG. 5 depicts the client device providing second resource(s) 102(2) associated with a second parameter 110(2) and third resource(s) 102(3) associated with a third parameter 110(3) to the server(s) 116. For example, different resources 102 may be used with different versions of an application 104. Continuing the example, a first version of the application 104 may include source code 108 that references the parameter 110 "{Name}", while a second version of the application 104 includes source code 108 that references the parameter 110 "{Firstname}". Different user devices 106 may store different versions of the application 104 depending on the particular devices, locations, and so forth to which particular versions of the application 104 were deployed. The parameter identifier module 502 may generate different parameter identifiers 504 based on the parameters 110 associated with each received resource 102. For example, FIG. 5 depicts the second resource(s) 102(2) including the parameter 110(2) "{Name}", which matches the first parameter 110(1) associated with the first resource(s) 102(1). As a result, the second parameter identifier 504(2) generated based on the name of the of the second parameter 110(2) matches the first parameter identifier 504(1) generated based on the name of the first parameter 110(1). The parameter identifier 504(3) generated based on the name of the third parameter 110(3) differs from the parameter identifiers 504 for the first and second parameters 110. The second parameter identifier 504(2) and third parameter identifier 504(3) may function as signatures representative of the parameters 110 associated with the corresponding resources 102. As a result, different resources 102 associated with the same parameter identifiers 504 may include matching parameters 110. As such, a parameter identifier 504 for a particular resource 102 may be used to reduce the likelihood of errors by identifying other resources 102 that include matching parameters 110 and resources 102 that include parameters 110 that do not match those of the particular resource 102. A modified resource 102(2) may then not be used to replace an original resource 102(1) unless the parameter identifiers 504 for both resources 102 match. While FIG. 5 depicts example resources 102 that each include a single parameter 110, in other implementations, a resource 102 may include multiple parameters 110. In such a case, the parameter identifier 504 for a resource 102 may be generated based on the characteristics of each parameter 110 associated with the resource 102. For example, a resource 102 that includes a first parameter 110 and a second parameter 110 may be associated with a first parameter identifier 504, while a different resource 102 that includes only the first parameter 110 may be associated with a different parameter identifier 504 due to the lack of the second parameter 110 associated with the resource 102.

At a third time T3, the user device 106 may provide a request 506 to the server(s) 116, or in some implementations, to the client device 114, to obtain modified resources 102. In some implementations, a request 506 may be provided periodically, such as after a lapse of a selected time period. In other implementations, a request 506 may be provided upon occurrence of an event, such as execution or start-up of the application 104, or upon user input to obtain modified resources 102. The request 506 may include an indication of the parameter identifier 504(1) associated with the resources 102(1) stored in association with the user device 106. For example, the request 506 may include a checksum or other type of value or identifier that represents the resources 102(1) that were previously provided to the user device 106. A resource determination module 508 associated with the server(s) 116 may determine correspondence between the parameter identifier 504(1) of the request 506 and the parameter identifiers 504 of other resources 102 stored in association with the server(s) 116. For example, the resource determination module 508 may generate a resource determination 510 that indicates that the parameter identifier 504(1) for the first resource 102(1) and the parameter identifier 504(2) for the second resource 102(2) match. In some cases, the resource determination 510 may also indicate that the parameter identifier 504(1) for the first resource 102(1) does not match the parameter identifier 504(3) for the third resource 102(3). Based on the correspondence between the matching parameter identifiers 504, the resource deployment module 126 may determine the resources 102 associated with the matching parameter identifiers 504 and provide the resources 102 to the user device 106. For example, FIG. 5 depicts the resource deployment module 126 providing the second resource 102(2) to the user device 106 in response to the resource determination 510 indicating that the first parameter identifier 504(1) associated with the request 506 matches the second parameter identifier 504(2) for the second resource 102(1). In other implementations, the request 506 may not necessarily indicate the parameter identifier 504(1), and the server(s) 116 or another computing device may store the parameter identifiers 504 associated with the user device 106. In such a case, upon receipt of the request 506, the resource determination module 508 may determine the parameter identifier 504(1) associated with the user device 106 using the stored parameter identifiers 504. Resources that are received by the user device 106 may be stored in a local cache to reduce the computational resources used to update resources 102 on each occasion that the application 104 is launched.

Figure 6:
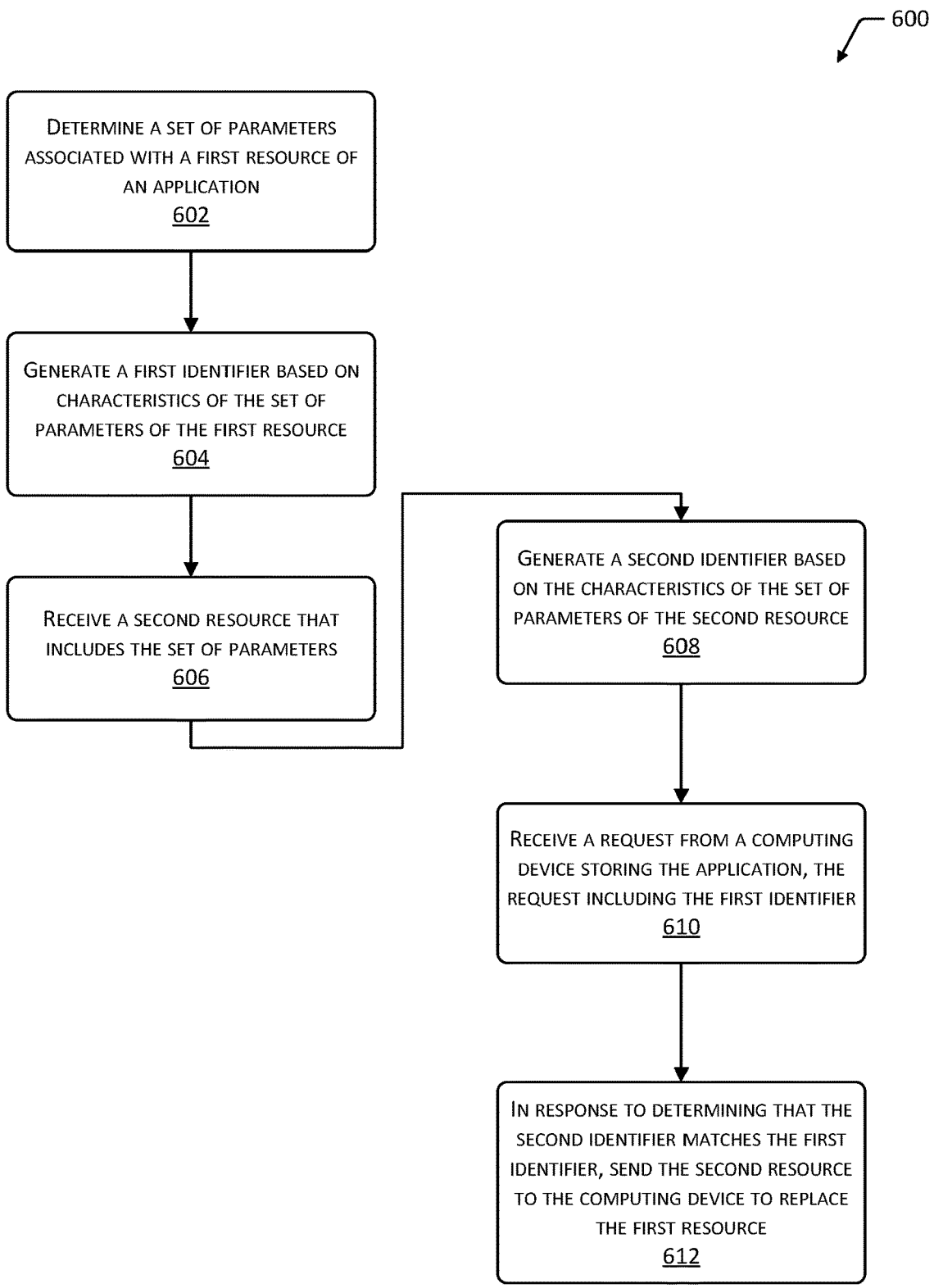
FIG. 6 is a flow diagram illustrating an implementation of a method for modifying resources for an application using parameter identifiers generated based on characteristics of the parameters included in the resources.

FIG. 6 is a flow diagram 600 illustrating an implementation of a method for modifying resources 102 for an application 104 using parameter identifiers 504 generated based on characteristics of the parameters 110 included in the resources 102. At 602, a set of parameters 110 associated with a first resource 102(1) of an application 104 may be determined. A set of parameters 110 may include any number of parameters 110, including zero parameters 110 in some cases. For example, a resource 102 may include a text string without a reference to a parameter 110. In other cases, a resource 102 may reference a single parameter 110, or multiple parameters 110. In some implementations, the parameter(s) 110 may be determined when the application 104 is provided to a server 116 from a client device 114 or when the application 104 is provided from the client device 114 or server 116 to a user device 106. In other implementations, the parameter(s) 110 may be determined periodically, such as after passage of a selected length of time. For example, a parameter identifier module 502 or other module associated with a server 116 may periodically query the applications 104 or resources 102 stored in association with the server 116 to determine parameters 110 for which no parameter identifier 504 has previously been generated. In still other implementations, the parameter(s) 110 may be determined in response to user input requesting generation of a parameter identifier 504.

At 604, a first identifier may be generated based on characteristics of the set of parameters 110. As described with regard to FIG. 5, a parameter identifier 504(1) may be generated based on the names of the parameter(s) 110, or other characteristics of the parameter(s) 110. In some implementations, the parameter identifier 504(1) may include a hash code. If a resource 102 includes multiple parameters 110, in some cases, a single parameter identifier 504 may be generated based on the characteristics of each parameter 110 of the resource 102, a subset of the parameters 110, or a single parameter 110. In some implementations, a resource 102 may be associated with multiple parameter identifiers 504, each generated based on a single parameter 110 or subset of parameters 110.

At 606, a second resource 102(2) that includes the set of parameters 110 may be received to replace the first resource 102(1). At 608, a second identifier may be generated based on the characteristics of the set of parameters 110 of the second resource 102(2). For example, a second parameter identifier 504(2) may be generated based on the name(s) of the parameter(s) 110 associated with the second resource 102(2). Similar to the first resource 102(1), if the second resource 102(2) includes multiple parameters 110, a single parameter identifier 504 may be generated based on characteristics of multiple parameters 110, or multiple parameter identifiers 504 may be generated. The parameter identifier 504(2) for the parameter(s) 110 of the second resource 102(2) may be generated based on the same characteristics of the parameter(s) 110 that were used to generate the first parameter identifier 504(1). For example, both parameter identifiers 504 may be generated based on the names of the associated parameters 110. As such, if both sets of parameters 110 share the same characteristics, the parameter identifiers 504 may be the same. This may enable modified resources 102 that do not change the parameters 110 of the original resources 102 (e.g., compatible changes that are unlikely to cause errors) to be identified based on parameter identifiers 504. As described with regard to FIG. 5, use of parameter identifiers 504 may also enable computing devices to identify and obtain modified resources 102 that are related to current versions of resources 102 based on matching parameter identifiers 504.

At 610, a request 506 may be received from a computing device that stores the application 104. The request 506 may indicate the first identifier. In other implementations, parameter identifiers 504 associated with the requesting computing device may be stored in association with the server(s) 116 or other computing device(s) receiving the request 506. At 612, a determination may be made that the second identifier for the second resource 102(2) matches the first identifier for the first resource 102(1). In response to this determination, the second resource 102(2) may be sent to the computing device to replace the first resource 102(1).

Figure 7:
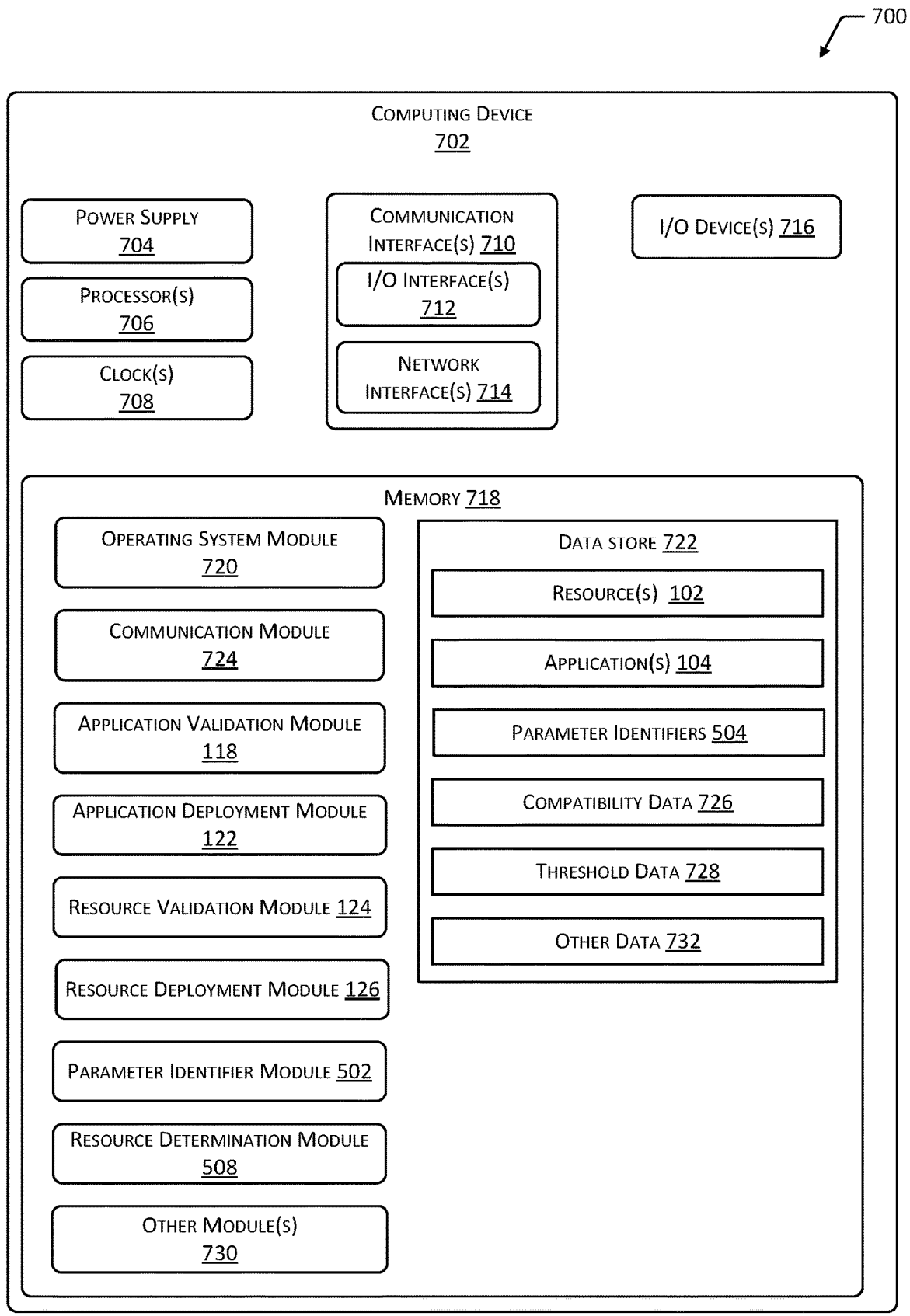
FIG. 7 is a block diagram illustrating an implementation of a computing device within the present disclosure.

FIG. 7 is a block diagram 700 illustrating an implementation of a computing device 702 within the present disclosure. The computing device 702 may include one or more servers 116, as shown in FIGS. 1 and 5. The computing device 702 may also include one or more client devices 114 or user devices 106. For example, one or more servers 116, client devices 114, and user devices 106, as well as other computing devices 702 in communication therewith, may be used in combination to perform the functions described in this disclosure. As such, while FIG. 7 depicts a single block diagram 700 of a computing device 702, any number and any type of computing devices 702 may be used to perform the functions described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input devices or output devices associated with the computing device 702. For example, I/O devices 716 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 716 may be physically incorporated with the computing device 702. In other implementations, I/O devices 716 may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, 5G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

A communication module 724 may be configured to establish communications with one or more other computing devices 702. Communications may be authenticated, encrypted, and so forth.

The memory 718 may also store the application validation module 118. The application validation module 118 may determine correspondence between resources 102 referenced by the source code 108 of an application 104 and parameters 110 included in the resources 102 associated with the application 104. In some implementations, the application validation module 118 may generate a compatibility determination 120 indicating whether the parameters 110 of the resources 102 match those indicated in the source code 108. The parameters 110 of the resources 102 may match those of the source code 108 if the source code 108 does not utilize a parameter 110 not included in the resources 102. In some cases, a match may also be determined when the resources 102 do not reference a parameter 110 not included in the source code 108. For example, the source code 108 and the resources 102 may reference the same number of parameters 110, and the parameters 110 for the source code 108 and resources 102 may have the same names and other characteristics. If the parameters 110 of the resources 102 match those indicated by the source code 108, the application 104 may be prepared for deployment to other computing devices 702.

The memory 718 may additionally store the application deployment module 122. The application deployment module 122 may cause an application 104 to be provided to one or more other computing devices 702 in response to a compatibility determination 120 indicating that the parameters 110 of the resources 102 match those indicated by the source code 108 of the application 104. In some implementations, the application 104 may be provided to other computing devices 702 using a push architecture. In other implementations, the application 104 may be provided in response to requests 506 or other types of communications from computing devices 702, via a pull architecture.

The memory 718 may store the resource validation module 124. The resource validation module 124 may receive a modified version of a resource 102(2) that is intended to replace a current version of a resource 102(1). The resource validation module 124 may determine correspondence between the parameters 110 of the modified resource 102(2) and those of the current resource 102(1) and generate a compatibility determination 120 indicating whether the parameters 110 of the modified resource 102(2) match those of the current resource 102(1). In some implementations, the resource validation module 124 may determine this correspondence without referencing or modifying the source code 108 of the application 104. For example, the parameters 110 associated with a modified resource 102(2) may be compared to those of a current resource 102(1) independent of the source code 108 or the characteristics of other resources 102 associated with the application 104. If the parameters 110 of the modified resource 102(2) match those of the current resource 102(1), the modified resource 102(2) may be prepared for deployment to one or more computing devices 702. In some implementations, the resource validation module 124 may access compatibility data 726 that indicates one or more rules associated with compatible changes to resources 102, incompatible changes, and changes for which a notification may be generated, as described with regard to FIGS. 2 and 3. For example, the compatibility data 726 may indicate characteristics of parameters 110 that may be used to determine a match or a mismatch, such as the parameter name or parameter type. In some cases, a change to a resource 102 may be determined to be compatible or incompatible based on one or more rules indicated in the compatibility data 726. As one example, a change made to a note field of a resource 102 that provides context regarding the content or meaning of particular portions of the resource 102 may be selected to be an incompatible change independent of the parameters 110 affected by the change. In some implementations, the resource validation module 124 may access threshold data 728 indicative of one or more threshold values. For example, if a quantity of text associated with a resource 102 is changed by more than a threshold value indicated in the threshold data 728, the resource validation module 124 may generate a notification requesting user review for the modification to the resource 102.

The memory 718 may also store the resource deployment module 126. The resource deployment module 126 may cause a resource 102 to be provided to one or more other computing devices 702 in response to a compatibility determination 120 indicating that the parameters 110 of a second resource 102(2) match the parameters 110 of a first resource 102(1) that is intended to be replaced by the second resource 102(2). In some implementations, the modified resource 102(2) may be provided to other computing devices 702 using a push architecture. In other implementations, the modified resource 102(2) may be provided in response to requests 506 or other types of communications from computing devices 702, via a pull architecture. As described with regard to FIGS. 5-6, in some implementations, resources 102 may be provided to computing devices 702 based on matching parameter identifiers 504.

The memory 718 may additionally store the parameter identifier module 502. The parameter identifier module 502 may generate parameter identifiers 504 based on characteristics of the parameters 110 associated with resources 102, such as the parameter names for the parameters 110. Each resource 102 may be associated with a single parameter identifier 504 that is generated based on all or a subset of the parameters 110 associated with the resource 102. In other implementations, a resource 102 may be associated with multiple parameter identifiers 504, each of which is associated with one or a subset of parameters 110. In some implementations, a parameter identifier 504 may include a hash code.

The memory 718 may store the resource determination module 508. The resource determination module 508 may determine modified versions of resources 102 associated with parameter identifiers 504 that match the parameter identifiers 504 of current versions of resources 102. For example, as described with regard to FIGS. 5 and 6, in response to a request 506 from a computing device 702, one or more parameter identifiers 504 associated with the request 506, the requesting device, or the application 104 may be determined. The resource determination module 508 may determine resources 102 having parameter identifiers 504 that match those associated with the request 506, requesting device, or application 104. Resources 102 that are associated with matching parameter identifiers 504 may have characteristics that match those of the resources 102 stored in association with the requesting device. As such, the resources 102 associated with matching parameter identifiers 504 may be prepared for deployment to requesting devices.

Other modules 730 may also be present in the memory 718. For example, other modules 730 may include modules editing, testing, and executing applications 104, modifying source code 108, modifying resources 102, modifying the compatibility data 726 or threshold data 728, and so forth. Other modules 730 may include a module for determining characteristics of computing devices 702, such as characteristics of user devices 106, versions of applications 104 or resources 102 associated with the user devices 106, and so forth. Other modules 730 may also include encryption modules to encrypt and decrypt communications between computing devices 702, authentication modules to authenticate communications sent or received by computing devices 702, a permission module to assign, determine, and manage user permissions to access or modify data associated with computing devices 702, and so forth.

Other data 732 within the data store(s) 722 may include configurations, settings, preferences, and default values associated with computing devices 702. Other data 732 may also include encryption keys and schema, access credentials, and so forth. Other data 732 may also include network data indicative of networks and other computing devices 702 accessible to one or more computing devices 702.

In different implementations, different computing devices 702 may have different capabilities or capacities. For example, servers 116 may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive an application for presenting a user interface, wherein the application includes:
a first resource that causes presentation of a first text string in the user interface when the application is executed,
wherein the first resource references a first parameter; and
source code that references the first resource;
determine that the first parameter of the first resource is indicated by the source code;
in response to the source code indicating the first parameter of the first resource, provide the application to a computing device configured to execute the application;
receive a second resource to replace the first resource, wherein the second
resource causes presentation of a second text string when the application is executed, and the second resource references the first parameter;
determine that a name associated with the first parameter of the second resource matches the name associated with the first parameter of the first resource,
a type associated with the first parameter of the first resource matches the type associated with the first parameter of the second resource,
a count of parameters associated with the first resource matches a count of parameters associated with the second resource, the first resource does not include a parameter not referenced by the second resource, and
the second resource does not include a parameter not referenced by the first resource;
determine that a difference between the second text string and the first text string exceeds a threshold value;
in response to the difference exceeding the threshold value, generate a notification requesting user review of the second resource; and
cause the computing device to one or more of modify the first resource based on the second resource or replace the first resource with the second resource.

2. The system of claim 1, further comprising computer-executable instructions to:
  generate a first hash code based on the first parameter of the second resource;
  generate a second hash code based on the first parameter of the first resource associated with the computing device;
  determine execution of the application associated with the computing device; and
  determine that the first hash code matches the second hash code;
  wherein the second resource is provided to the computing device in response to the first hash code matching the second hash code.

3. The system of claim 1, further comprising computer-executable instructions to:
  determine a first count of characters associated with the first text string;
  determine a second count of characters associated with the second text string, wherein the difference between the second text string and the first text string includes the second count of characters differing from the first count of characters by at least the threshold value; and
  receive user input approving the second resource, wherein the second resource is provided to the computing device further in response to the user input approving the second resource.

4. A method comprising:
  accessing an application associated with source code that references a first resource, wherein the first resource includes a first set of parameters;
    receiving a second resource to replace the first resource, wherein the second resource includes a second set of parameters;
    determining correspondence between the first set of parameters and the second set of parameters, wherein the correspondence indicates one of a match or a mismatch between the first set of parameters and the second set of parameters, and wherein the correspondence is determined without determining correspondence between the second set of parameters and the source code;
      in response to the match between the first set of parameters and the second set of parameters, associating the second resource with the application by causing a computing device associated with the application to one or more of modify the first resource based on the second resource or replace the first resource with the second resource; and
      in response to the mismatch between the first set of parameters and the second set of parameters, maintaining association of the first resource with the application.

5. The method of claim 4, wherein the correspondence indicates the match between the first set of parameters and the second set of parameters, the method further comprising:
  in response to the correspondence, providing the second resource to the computing device associated with the application.

6. The method of claim 4, wherein the correspondence indicates the mismatch between the first set of parameters and the second set of parameters, the method further comprising:
  generating a notification indicative of the mismatch between the first set of parameters and the second set of parameters, wherein the notification indicates at least one parameter of the second set of parameters.

7. The method of claim 4, further comprising:
  determining that the first resource lacks a parameter that matches at least one parameter of the second set of parameters; and
  generating a notification indicative of a mismatch associated with the at least one parameter of the second set of parameters, wherein the first resource is associated with the application further in response to the mismatch.

8. The method of claim 4, further comprising:
  determining that the second resource lacks a parameter that matches at least one parameter of the first set of parameters; and
  generating a notification indicative of a mismatch associated with the first set of parameters, wherein the first resource is associated with the application further in response to the mismatch.

9. The method of claim 4, further comprising:
  determining a first directional presentation of text associated with the first resource;
  determining a second directional presentation of text associated with the second resource;
  determining that the second directional presentation differs from the first directional presentation; and
  in response to the second directional presentation differing from the first directional presentation, generating a notification requesting user review of the second resource;
  wherein the second resource is associated with the application further in response to user input associated with the second resource.

10. The method of claim 4, wherein the first resource includes a first string and the second resource includes a second string, the method further comprising:
  determining that a difference between the second string and the first string exceeds a threshold value; and
  in response to the difference exceeding the threshold value, generating a notification requesting user review of the second resource.

11. The method of claim 4, further comprising:
  generating a first identifier indicative of the first set of parameters;
  generating a second identifier indicative of the second set of parameters; and
  determining that the second identifier matches the first identifier, wherein the second resource is associated with the application in response to the second identifier matching the first identifier.

12. The method of claim 4, further comprising:
  determining that the first set of parameters of the first resource is used by the source code; and
  associating the first resource with the application.

13. A system comprising:
  one or more memories storing computer-executable instructions; and
    one or more hardware processors to execute the computer-executable instructions to:
      determine a first parameter associated with a first resource of an application, wherein the application is associated with source code that references the first resource;
      generate a first identifier based on a characteristic of the first parameter;
      receive a second resource that includes a second parameter;
      generate a second identifier based on the characteristic of the second parameter;

determine that the second identifier matches the first identifier, wherein the second identifier matching the first identifier indicates that the characteristic of the first parameter matches the characteristic of the second parameter, and wherein the second identifier matching the first identifier is determined without determining correspondence between the second parameter and the source code; and in response to the second identifier matching the first identifier, one or more of modify the first resource based on the second resource or replace the first resource with the second resource.

14. The system of claim 13, further comprising computer-executable instructions to:

determine execution of the application, wherein the second identifier is determined to match the first identifier in response to execution of the application.

15. The system of claim 13, wherein the first resource is associated with a first string and the second resource is associated with a second string that is different from the first string, the system further comprising computer-executable instructions to:

determine that a size of the first string differs from a size of the second string by at least a threshold value;

in response to the size of the first string differing from the size of the second string by at least the threshold value, generate a notification requesting user input associated with the second resource;

prior to receipt of user input approving the second resource, use the first resource in association with the application; and receive the user input approving the second resource;

wherein the first resource is replaced with the second resource further in response to the user input.

16. The system of claim 13, wherein the first identifier is generated based on a first name associated with the first parameter, the second identifier is generated based on a second name associated with the second parameter, and the first parameter matching the second parameter indicates that the first name matches the second name.

17. The system of claim 13, wherein the first identifier includes a first hash code generated based on the characteristic of the first parameter and the second identifier includes a second hash code based on the characteristic of the second parameter.

18. The system of claim 13, further comprising computer-executable instructions to:

determine that a first count of parameters associated with the first resource matches a second count of parameters associated with the second resource;

wherein the first resource is one or more of modified based on the second resource or replaced with the second resource further in response to the first count of parameters matching the second count of parameters.

19. The system of claim 13, further comprising computer-executable instructions to:

determine that a first type associated with the first parameter of the first resource matches a second type of the second parameter of the second resource;

wherein the first resource is one or more of modified based on the second resource or replaced with the second resource further in response to the first type matching the second type.

20. The system of claim 13, further comprising computer-executable instructions to:

determine that the first parameter of the first resource is used by the source code; and associate the first resource with the application;

wherein the first identifier is generated based on the first parameter in response to association of the first resource with the application.

* * * * *